United States Patent Office 3,763,215
Patented Oct. 2, 1973

3,763,215
THERAPEUTICALLY ACTIVE COMPOUNDS
John Krapcho, Somerset, and Jack Bernstein, New Brunswick, N.J., assignors to E. R. Squibb & Sons, Inc., New York, N.Y.
No Drawing. Application May 28, 1970, Ser. No. 50,003, which is a division of application Ser. No. 533,264, Mar. 10, 1966. Divided and this application Aug. 7, 1972, Ser. No. 278,505
Int. Cl. C07c 149/40
U.S. Cl. 260—470    3 Claims

ABSTRACT OF THE DISCLOSURE

Disclosed herein are compounds having the formula

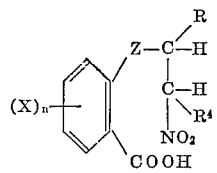

wherein Z is oxygen or sulfur; X is hydrogen, lower alkyl, lower alkoxy, amino, dialkylamino, halo, lower alkylthio, hydroxy, cyano, nitro or trifluoromethyl; R is aryl; $R^4$ is hydrogen or lower alkyl; and $n$ is 1 to 4; and esters thereof. These compounds are intermediates for compounds which have central nervous system modifying activity.

RELATED APPLICATIONS

This application is a division of copending application Ser. No. 50,003, filed May 28, 1970, which in turn is a division of earlier filed application Ser. No. 533,264, filed Mar. 10, 1966.

This invention relates to new chemical compounds having valuable therapeutic properties and processes for the preparation thereof.

The therapeutically active compounds of this invention are of the General Formula I:

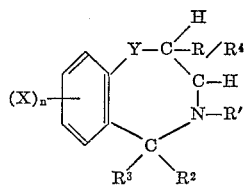

and salts thereof, wherein Y is thia (—S—), sulfone (—$SO_2$—), sulfoxide, (—SO—, and oxa (—O—); R is aryl; $R^1$ is hydrogen, alkyl, haloalkyl, aralkyl, X-substituted aralkyl, allyl, propargyl, cinnamyl, cycloalkylalkylene or —A—B; $R^2$ and $R^3$ are hydrogen or $R^2$ and $R^3$ together are oxo (O=); $R^4$ is hydrogen or lower alkyl; X is hydrogen, lower alkyl, lower alkoxy, amino, dialkylamino, halo, lower alkylthio (e.g., $CH_3CH_2CH_2S$—), hydroxy, cyano, nitro or trifluoromethyl; $n$ is 1 to 4; A is lower alkylene (preferably ethylene and propylene); and B is a basic nitrogen-containing radical of less than twelve carbon atoms. Among the suitable radicals represented by the symbol B are: amino; (lower alkyl)amino; di-(lower alkyl)amino; (hydroxy-lower alkyl)amino; di(hydroxy lower alkyl)amino; phenyl(lower alkyl)amino; N-(lower alkyl)phenyl (lower alkyl)amino; and saturated 5- to 7-membered monocyclic heterocyclic radicals of less than twelve carbon atoms, as exemplified by piperidino; (lower alkyl)piperidino; di(lower alkyl)piperidino; (lower alkoxy)piperidino; homopiperidino; 2,3- or 4-piperidyl; 2,3- or 4-(N-lower alkyl-piperidyl); pyrrolidino; (lower alkyl)pyrrolidino; di(lower alkyl)pyrrolidino; (lower alkoxy)pyrrolidino; 2- or 3-pyrrolidyl; 2- or 3- (N-lower alkyl pyrrolidyl); morpholino; (lower alkyl) morpholino; di(lower alkyl)morpholino; (lower alkoxy) morpholino; thiamorpholino; (lower alkyl)thiamorpholino; di(lower alkyl)thiamorpholino; (lower alkoxy)thiamorpholino; piperazino; 4-$R^1$-substituted piperazino (e.g., $N^4$-ethylpiperazino); [hydroxy(lower alkyl)]piperazino [e.g., $N^4$-(2-hydroxyethyl)piperazino]; (lower alkyl)piperazino (e.g., $N^4$-methylpiperazino); di(lower alkyl)piperazino; (lower alkoxy)piperazino; homopiperazino; and 4-$R^1$-substituted homopiperazino (e.g., $N^4$-benzylhomopiperazino). The terms "lower alkyl," "lower alkoxy," and "lower alkylene," as employed herein, include both straight and branched chain radicals of less than eight carbon atoms. The term "aryl" as employed herein includes mononuclear and dinuclear radicals such as X-substituted phenyl (including 3,4-methylenedioxyphenyl and 3,4-ethylenedioxyphenyl), furyl, thienyl, naphthyl or pyridyl. The particularly preferred compounds are those wherein X is hydrogen, Y is sulfur, R is phenyl, $R^1$ is —A—B, wherein A is ethylene and N is dimethylamino and $R^2$ and $R^3$ together is oxo.

As to the salts, those coming within the purview of this invention include the acid-addition salts of those compounds containing a basic group (e.g., wherein $R^1$ is —A—B or $R^2$ and $R^3$ are both hydrogen) particularly the non-toxic acid-addition salts and the quaternary ammonium salts. Acids useful for preparing these acid-addition salts include, inter alia, inorganic acids, such as the hydrohalic acids (e.g., hydrochloric and hydrobromic acid, sulfuric acid, nitric acid, and phosphoric acid, and organic acids such as maleic, tartaric, citric, acetic, salicylic, succinic acid, theophylline 8-chlorotheophylline, maleic, benzoic, nicotinic, methanesulfonic or cyclohexanesulfamic. The quaternary ammonium salts include those formed with lower alkyl halides (e.g., methyl bromide, ethyl chloride and propyl iodide), benzyl halides (e.g., benzyl chloride) and dilower alkyl sulfates (e.g., dimethyl sulfate).

Compounds of this invention and the salts thereof possess central nervous system modifying activity, particularly as depressants and are therefore useful as tranquilizers. They may be administered orally or parenterally in the form of tablets, capsules, elixirs, injectables, or the like, by incorporating the appropriate dosage of the compound of Formula I or a physiologically acceptable salt thereof in a dosage range similar to that used with chlordiazepoxide.

The compounds of this invention may be prepared by the following novel process. Thiosalicylic acid, salicylic acid or an X-substituted derivative thereof, is condensed with a nitro-compound having a Formula II

$$RCH=CH^4—NO_2$$

wherein R and $R^4$ are as defined hereinabove. This condensation yields a product having Formula III

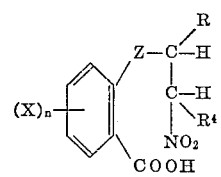

wherein Z is oxa or thia and R and $R^4$ are as defined above. The acid group is converted to an ester (e.g., methyl ester) and then treated with a reducing agent. Any reducing agent may be utilized in the practice of this invention such as iron-acetic acid, tin-hydrochloric acid, with the preferred reducing agent being stannous chloride.
The product formed has the Formula IV:

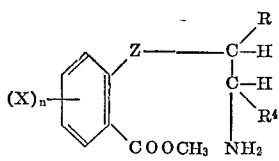

wherein X, R, $R^4$ and $n$ are as hereinabove described
Compound IV is heated to form the novel intermediate ring Compound V:

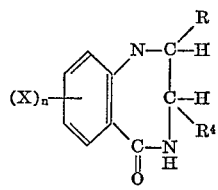

Alternately, Compound V may be prepared by treating Compound III with stannous chloride and the resulting amino acid heated in the same manner as utilized in the conversion of Compound IV to Compound V. Compound V is then condensed with an aminoalkyl halide of the formula B—A—$Y^1$ or $R^1Y^1$ wherein B, A and $R^1$ are as hereinbefore defined and $Y^1$ is halide, e.g., bromine, chlorine, and so forth, to give Compound I. This reaction is preferably conducted by heating the reactants in the presence of a basic condensing agent, such as an alkali metal, an alkali metal amide (e.g., sodamide), or an alkali metal hydroxide. In some cases where $R^1$ is —A—B in Compound I, it is preferred to react Compound V with $Y^1$—A—$Y^1$ to give a compound where $R^1$=—A—$Y^1$. This material is then heated with H—B in an inert solvent as benzene or toluene. To form the acid-addition salts or the quaternary ammonium salts, the free base initially formed is interacted with at least one equivalent of the desired acid or quaternary ammonium hydrocarbon halide.

Suitable derivatives of thiosalicylic and salicylic acid are:

3-butyl-2-mercaptobenzoic acid;
4-octyl-2-mercaptobenzoic acid;
3-methyl-5-butyl-2-mercaptobenzoic acid;
3-isobutoxy-2-mercaptobenzoic acid;
6-methyl-2-mercaptobenzoic acid;
5-amino-3-heptyl-2-mercaptobenzoic acid;
3,5-dichloro-2-mercaptobenzoic acid;
3,4,5,6-tetrafluoro-2-mercaptobenzoic acid;
4-pentylthio-2-mercaptobenzoic acid;
5-trifluoromethyl-2-mercaptobenzoic acid;
4-isopropyl-2-hydroxybenzoic acid;
3,4,5,6-tetramethyl-2-hydroxybenzoic acid;
3-methyl-5-butyl-2-hydroxybenzoic acid;
4-isobutoxyl-2-hydroxybenzoic acid;
4-cyano-2-hydroxybenzoic acid;
6-pentoxy-2-hydroxybenzoic acid;
3-bromo-2-hydroxybenzoic acid.

The reactants of Formula II may be prepared by the reacting of an aldehyde having the Formula R—CHO with a nitroalkane of the Formula $R^4$—$CH_2$—$NO_2$ wherein R and $R^4$ are defined above. Examples of Compound II are 1-(3-,4-dichlorophenyl)-2-nitroethene;
1-(2,3,4,5,6-pentafluorophenyl)-2-nitroethene;
1-(2,6-dichloro-3-methoxyphenyl)-2-nitrobutene;
1-(2-furyl)-2-nitroethene;
1-(2-thiophene)-2-nitroethene;
1-(2-pyridyl)-2-nitroethene;
1-(3,4-dimethylphenyl)-2-nitroethene;
1-(2,5-dioctylphenyl)-2-nitrobutene;
1-(2-hydroxyphenyl)-2-nitrobutene;
1-(4-isopropoxyphenyl)-2-nitrobutene;

and so forth.

Compound I wherein $R^2$ and $R^3$ together is oxo (O=) may be reduced as by treatment with a reducing agent such as lithium aluminum hydride in an organic solvent such as ether or tetrahydrofuran to give the compound wherein $R^2$ and $R^3$ are hydrogen.

The nitro-derivatives of the instant invention, wherein X is nitro, may be prepared by reacting compound V with fuming nitric acid. The product recovered may then be reduced to form an amino derivative. The hydroxy derivative of compound V may be formed by reacting a compound wherein X is alkoxy with concentrated hydrochloric acid or with pyridine hydrochloride. Final product V may be converted to its corresponding sulfone and sulfoxide derivatives by oxidation. Compound V may be reacted with hydrogen peroxide to yield the sulfoxides while if it is reacted with potassium permanganate, the sulfones will be produced.

The following examples illustrate the invention, all temperatures are in degrees centigrade unless otherwise stated:

EXAMPLE 1

3,4-dihydro-2-phenyl-2H-1,4-benzothiazepin-5-one (A) Preparation of 2-[[α-(nitromethyl)benzyl]thio]benzoic acid.—A mixture of 100 g. of thiosalicylic acid, 100 g. of ω-nitrostyrene and 300 ml. of ethanol is heated; the resulting solution refluxed for three hours, diluted with 15 ml. of water and cooled to give 160.3 g. of colorless crystalline product, M.P. 150–152°.

(B) Preparation of 2-[[α-(nitromethyl)benzyl]thio]benzoic acid, methyl ester.—A suspension of 141 g. of the material from part A in 300 ml. of chloroform is treated with 300 ml. of thionyl chloride and the mixture refluxed for three hours. The mixture is then concentrated until about 350 ml. of distillate is collected and the residue evaporated under reduced pressure to give 157 g. of the nearly colorless acid chloride, M.P. 89–91°. This material is treated with 600 ml. of methanol, heated and the resulting solution refluxed for three hours. Cooling this solution gives 141.1 g. of colorless product, M.P. 99–101°.

(C) Preparation of 2-[[α-(aminomethyl)benzyl]thiobenzoic acid, methyl ester.—A mixture of 130 g. of the material from part B, 350 g. of stannous chloride dihydrate and 1. 1. of methanol is treated with 300 ml. of acetic acid, refluxed for three hours and then distilled until 500 ml. of solvent is collected. The residue is cooled and poured onto a cold mixture of a solution of 700 g. of potassium carbonate in 1 l. of water, 200 ml. of chloroform and 600 ml. of ether. The mixture is shaken, the organic layer separated and the aqueous phase is extracted twice with a mixture of 200 ml. chloroform-600 ml. ether. The organic phases are combined, dried over magnesium sulfate, treated with Darco, filtered and concentrated under reduced pressure to give 110 g. of residue. This material is dissolved in 700 ml. of dry ether, decanted from the small quantity of insoluble material and the solution treated with 300 ml. of ether containing 45 ml. of 7.7 N alcoholic hydrogen chloride to give a hydrochloride salt which separates as an oil. The mother liquor is decanted from the oil and the latter placed under reduced pressure to give 98.5 g. of a foam-like solid. The latter is suspended in 500 ml. of ether, treated with 100 ml. of water and a solution of 45 g. of potassium carbonate in 80 ml. of water. The mixture is shaken, the organic phase is separated and the aqueous phase extracted twice with 300 ml. of ether. The organic phases are combined, dried over magnesium sulfate, treated with Darco, filtered and concentrated under reduced pressure to give 83.7 g. of product, a pale brown syrup. The ethyl, butyl, isobutyl, heptyl and octyl esters may be prepared in a like manner by utilizing the appropriate alcohol in lieu of methanol in the above example.

(D) Preparation of 3,4-dihydro-2-phenyl-2H-1,4-benzothiazepin-5-one.—Method A: A solution of 83.7 g. of material from part C in 900 ml. of xylene is refluxed for 8.5 hours; the mixture is then concentrated until 500 ml. of distillate is collected and the residue cooled to give 23.3 g. of nearly colorless solid, M.P. 180–182°. After recrystallization from ethanol, the colorless product melts at 183–185°.

Method B: A sample of material from part C (20.0 g.) is placed in 100 ml. flask and slowly heated and distilled (about 180–220° at 0.2 mm.) to give 15.9 g. of distillate. The latter is crystallized from 30 ml. of toluene to give 7.2 g. of colorless solid, M.P. 182–185°.

EXAMPLE 2

4-(2-dimethylaminoethyl)-3,4-dihydro-2-phenyl-2H-1,4-benzothiazepin-5-one, hydrochloride To a suspension of 1.4 g. of sodamide in 150 ml. of toluene is added 9.0 g. of the material from part D of Example 1 and the mixture heated to 60° to obtain a clear solution. The solution is cooled to 25°, treated with 45 ml. of 1.1 N toluene solution of 2-dimethylaminoethyl bromide and then heated at 50–70° for five hours. The mixture is cooled to room temperature, treated with 75 ml. of water and the layers are separated. The organic phase is extracted with a solution of 5 ml. of concentrated hydrochloric acid in 100 ml. of water. This aqueous phase is cooled and treated with a solution of 10 g. of potassium carbonate in 20 ml. of water to give an oily product which is extracted with three 100 ml. portions of ether. The ether phases are combined, dried over magnesium sulfate, filtered and concentrated under reduced pressure to give 5.6 g. of solid, M.P. 123–125°. After trituration with 50 ml. of hexane, the colorless product weighs 5.2 g., M.P. 125–127°. A solution of 5.0 g. of this base in 25 ml. of ethanol is treated with 2.0 ml. of 7.7 N alcoholic hydrogen chloride; the hydrochloride salt rapidly crystallizes and the mixture is diluted with 50 ml. of ether to give 5.4 g. of product, M.P. 266–268°. After recrystallization from 180 ml. of hot ethanol, the colorless material weighs 4.5 g., M.P. 271–273°.

This material is a mixture of d and l isomers. By treatement of the free base with an equivalent quantity of an optically active acid, such as d-tartaric acid, the isomers can be separated by differences of their solubility in organic solvents.

EXAMPLE 3

4-(diethylaminoethyl)-3,4-dihydro-2-phenyl-2H-1,4-benzothiazepin-5-one, hydrochloride A suspension of 1.8 g. of sodamide in 300 ml. of toluene is treated with 11.3 g. of material from part D of Example 1 and the mixture heated to 60°. The resulting solution is treated with 25 ml. of a 2.2 N toluene solution of 2-diethylaminoethyl chloride and then heated to 60–70° for three hours, followed by heating to reflux for a period of two hours. After cooling the reaction product is isolated according to the procedure used in Example 2 to give 14.5 g. of base as a syrupy oil. This material is dissolved in 300 ml. of ether, washed with 10 ml. of water (three times), dried over magnesium sulfate, filtered and concentrated under reduced pressure to give 12.3 g. of base. A solution of this material in 25 ml. of ethanol is treated with 4.5 ml. of 7.7 N alcoholic hydrogen chloride and the resulting solution diluted to 100 ml. with ether to give 11.7 g. of pale yellow solid, M.P. 194–197°. This material is digested in 35 ml. of hot acetonitrile, cooled and filtered to give 10.4 g. of colorless product, M.P. 213–215°. Recrystallization from 35 ml. ethanol gives 9.0 g. of crystalline product, M.P. 213–215°.

EXAMPLE 4

3,4-dihydro-4-[3-(4-methyl-1-piperazinyl)propyl]-2-phenyl-2H-1,4-benzothiazepin-5-one, dihydrochloride A suspension of 7.0 g. of material from part D of Example 1 in 85 ml. of toluene is stirred and treated with 4.4 g. of powdered sodium hydroxide. This mixture is stirred for five minutes, treated with 14 g. of finely divided 1-(3-bromo-propyl)-4-methylpiperazine dihydrobromide and then heated on a steam bath for forty-five minutes. The mixture is cooled, treated with 50 ml. of water and filtered. The aqueous phase is discarded and the product extracted from the organic phase in the manner described in Example 2 to give 2.5 g. of base. A solution of this material in 10 ml. of ethanol is treated with 2 ml. of 7.7 N alcoholic hydrochloride to give a crystalline mass. After dilution with 50 ml. of ether, the product is filtered to give 2.7 g. of product, M.P. 260–262°. Recrystallization from 60 ml. of methanol gives 1.9 g. of colorless product, M.P. 265–267°.

EXAMPLE 5

2,3,4,5-tetrahydro-2-phenyl-1,4-benzothiazepine, hydrochloride

To a suspension of 2.2 g. of lithium aluminum hydride in 600 ml. of ether is added 6.4 g. of the material from Example 1. The mixture is treated with 300 ml. of toluene, stirred, refluxed for nine hours, cooled and treated dropwise with 10 ml. of water and then with a solution of 2 g. of sodium hydroxide in 10 ml. of water. After stirring the mixture for two hours, the insoluble material is filtered and washed with ether. The filtrate is dried over magnesium sulfate, filtered and concentrated under reduced pressure to give 5.5 g. of an oily residue. The latter is dissolved in 40 ml. of ethanol and treated with 3 ml. of 7.7 N alcoholic hydrogen chloride. The hydrochloride salt, rapidly crystallized, is then diluted with 40 ml. of ether and filtered to give 4.9 g. of nearly colorless solid, M.P. 273–275°. After crystallization from 330 ml. of ethanol, the colorless product weighs 3.8 g., M.P. 275–277°.

EXAMPLE 6

4-(2-dimethylaminoethyl)-2,3,4,5-tetrahydro-2-phenyl-1,4-benzothiazepine, hydrochloride Following the procedure utilized in Example 5 but substituting an equivalent quantity of the free base of Example 2 for 3,4-dihydro-2-phenyl-2H-1,4-benzothiazepin-5-one the product formed is 4-(2-dimethylaminoethyl)-2,3,4,5-tetrahydro-2-phenyl-1,4-benzothiazepine, hydrochloride.

EXAMPLE 7

4-[2-(1-pyrrolidinyl)ethyl]-3,4-dihydro-2-phenyl-2H-1,4-benzothiazepin-5-one hydrochloride Following the procedure utilized in Example 2 but substituting an equivalent amount of 2-(1-pyrrolidinyl)ethyl chloride for the 2-dimethylaminoethyl bromide the product formed is 4-[2-(1-pyrrolidinyl)ethyl]-3,4-dihydro-2-phenyl-2H-1,4-benzothiazepin-5-one, hydrochloride.

EXAMPLE 8

4-(3-dimethylaminopropyl)-3,4-dihydro-2-phenyl-2H-1,4-benzothiazepin-5-one, hydrochloride Following the procedure utilized in Example 2 but substituting an equivalent amount of 3-dimethylaminopropyl bromide for the 2-dimethylaminoethyl bromide the product formed is 4-(3-dimethylaminopropyl)-3,4-dihydro-2-phenyl-2H-1,4-benzothiazepin-5-one, hydrochloride.

EXAMPLE 9

4-[2-(N-methyl-N-phenethylamino)ethyl]-3,4-dihydro-2-phenyl-2H-1,4-benzothiazepin-5-one, hydrochloride Following the procedure utilized in Example 2 but substituting an equivalent amount of 2-(N-methyl-N-phenethylamino)ethyl chloride for the 2-dimethylaminoethyl bromide the product formed is 4-[2-(N-methyl-N-phenethylamino)ethyl-3,4-dihydro-2-phenyl-2H-1,4-benzothiazepin-5-one, hydrochloride.

EXAMPLE 10

4-(2-morpholinoethyl)-3,4-dihydro-2-phenyl-2H-1,4-benzothiazepin-5-one, hydrochloride Following the procedure utilized in Example 2 but substituting an equivalent amount of 2-morpholinoethyl chloride for the 2-dimethylaminoethyl bromide the product formed is 4 - (2 - morpholinoethyl)-3,4-dihydro-2-phenyl-2H-1,4-benzothiazepin-5-one, hydrochloride.

EXAMPLE 11

7-methoxy-3,4-dihydro-2-furyl-2H-1,4-benzoxazepin-5-one

Following the procedure utilized in Example 1 but substituting 5-methoxy-2-hydroxybenzoic acid in lieu of thiosalicylic acid and 1-(2-furyl)-2-nitroethene in lieu of ω-nitrostyrene the product formed is 7-methoxy-3,4-dihydro-2-furyl-2H-1,4-benzoxazepin-5-one.

EXAMPLE 12

4-(2-dimethylaminoethyl)-8-nitro-3,4-dihydro-2-phenyl-2H-1,4-benzothiazepin-5-one 4 - (2 - dimethylaminoethyl) - 3,4 - dihydro-2-phenyl-2H-1,4-benzothiazepin-5-one of Example 2 is reacted with cold fuming nitric acid and the mixture poured onto ice-water. The product recovered is 4-(2-dimethylaminoethyl) - 8 - nitro - 3,4 - dihydro - 2 - phenyl - 2H - 1,4-benzothiazepin-5-one.

EXAMPLE 13

4-(2-dimethylaminoethyl)-3,4-dihydro-2-phenyl-2H-1,4-benzothiazepin-5-one, 1-oxide To a solution of hydrogen peroxide 4-(2-dimethylaminoethyl) - 3,4 - dihydro - 2 - phenyl-2H-1,4-benzothiazepin-5-one is added and the product recovered is 4-(2 - dimethylaminoethyl) - 3,4 - dihydro-2-phenyl-2H-1,4-benzothiazepin-5-one, 1-oxide.

EXAMPLE 14

4-(2-dimethylaminoethyl)-3,4-dihydro-2-phenyl-2H-1,4-benzothiazepin-5-one, 1,1-dioxide Repeating the procedure of Example 11 but utilizing potassium permanganate in lieu of hydrogen peroxide the product recovered is 4 - (2 - dimethylaminoethyl)-3,4-dihydro - 2 - phenyl - 2H - 1,4 - benzothiazepin-5-one, 1,1-dioxide.

EXAMPLE 15

2-(p-chlorophenyl)-3,4-dihydro-3-ethyl-2H-1,4-benzothiazepin-5-one

Following the procedure utilized in Example 1 but substituting an equivalent quantity of 1 - (p-chlorophenyl)-2 - nitrobutene for the ω-nitrostyrene the product formed is 2 - (p-chlorophenyl) - 3,4 - dihydro-3-ethyl-2H-1,4-benzothiazepin-5-one.

EXAMPLE 16

3,4-dihydro-4-methyl-2-phenyl-2H-1,4-benzothiazepin-5-one

Following the procedure utilized in Example 3 but substituting an equivalent quantity of dimethyl sulfate for the 2-diethylaminoethyl chloride the product formed is 3,4 -dihydro - 4 - methyl - 2 - phenyl - 2H-1,4-benzothiazepin-5-one.

EXAMPLE 17

4-(3-chloropropyl)-3,4-dihydro-2-phenyl-2H-1,4-benzothiazepin-5-one

Following the procedure utilized in Example 2 but substituting an equivalent amount of 1-bromo-3-chloropropane for the 2-dimethylaminoethyl bromide the product formed is 4-(3-chloropropyl)-3,4-dihydro-2-phenyl-2H-1,4-benzothiazepin-5-one.

EXAMPLE 18

3,4 - dihydro - 4 - [3 - (4 - β-hydroxyethyl-1-piperazinyl) propyl] - 2 - phenyl - 2H - 1,4 - benzothiazepin - 5-one, hydrochloride A solution of equivalent quantities of the material from Example 17 and 1-β-hydroxyethylpiperazine in toluene is heated and refluxed for two hours and the solvent removed under reduced pressure to give 3,4-dihydro-4-[3-(4 - β-hydroxyethyl - 1 - piperazinyl)propyl] - 2 - phenyl-2H-1,4-benzothiazepin-5-one, hydrochloride.

EXAMPLE 19

3,4-dihydro-2-(5-ethyl-2-pyridyl)-2H-1,4-benzothiazepin-5-one

Following the procedure utilized in Example 1 but substituting an equivalent amount of 1-(5-ethyl-2-pyridyl)-2-nitroethene for the ω-nitrostyrene the product formed is 3,4 - dihydro - 2 - (5 - ethyl - 2 - pyridyl) - 2H-1,4-benzothiazepin-5-one.

EXAMPLE 20

4-(2-dimethylaminoethyl)-3,4-dihydro-2-phenyl-2H-1,4-benzothiazepin-5-one, methochloride A solution of 5.0 g. of the free base of the material from Example 2 in 50 ml. of acetonitrile is cooled and treated with 15 g. of methyl chloride. The solution is allowed to stand for a day at room temperature and the solvent removed under reduced pressure to give 4-(2-dimethylaminoethyl) - 3,4 - dihydro - 2 - phenyl-2H-1,4-benzothiazepin-5-one, methochloride.

EXAMPLE 21

By substitution of equivalent quantities of 3-morpholinopropyl chloride; 2-pyrrolidinopropyl chloride; and 2 - (4-methylpiperazino)ethyl chloride in place of the 2-diethylaminoethyl chloride in Example 3 gives 4 - (3-morpholinopropyl) - 3,4 - dihydro - 2 - phenyl - 2H - 1,4-benzothiazepin-5-one, hydrochloride; 4-(3-pyrrolidinopropyl)-3,4 - dihydro - 2 - phenyl - 2H - 1,4-benzothiazepin-5-one, hydrochloride; and 4 - [2 - (4 - methylpiperazino)-ethyl]-3,4 - dihydro - 2 - phenyl - 2H - 1,4 - benzothiazepin-5-one, hydrochloride, respectively.

The invention may be variously otherwise embodied within the scope of the appended claims.

What is claimed is:

1. A compound having the formula

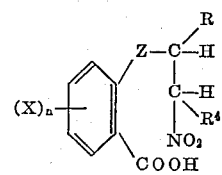

wherein Z is sulfur; X is hydrogen, lower alkyl, halo, or trifluoromethyl; R is phenyl; $R^4$ is hydrogen or lower alkyl; and $n$ is 1 to 4; and methyl esters thereof.

2. A compound of claim 1 which is 2 - [[α-(nitromethyl)benzyl]thio]benzoic acid, methyl ester.

3. A compound of claim 1 which is 2 - [[α-(nitromethyl)benzyl]thio]benzoic acid.

References Cited
UNITED STATES PATENTS 3,105,090    9/1963    Leonard _____ 260—470

LORRAINE A. WEINBERGER, Primary Examiner

J. F. TERAPANE, Assistant Examiner

U.S. Cl. X.R.

260—516